UNITED STATES PATENT OFFICE.

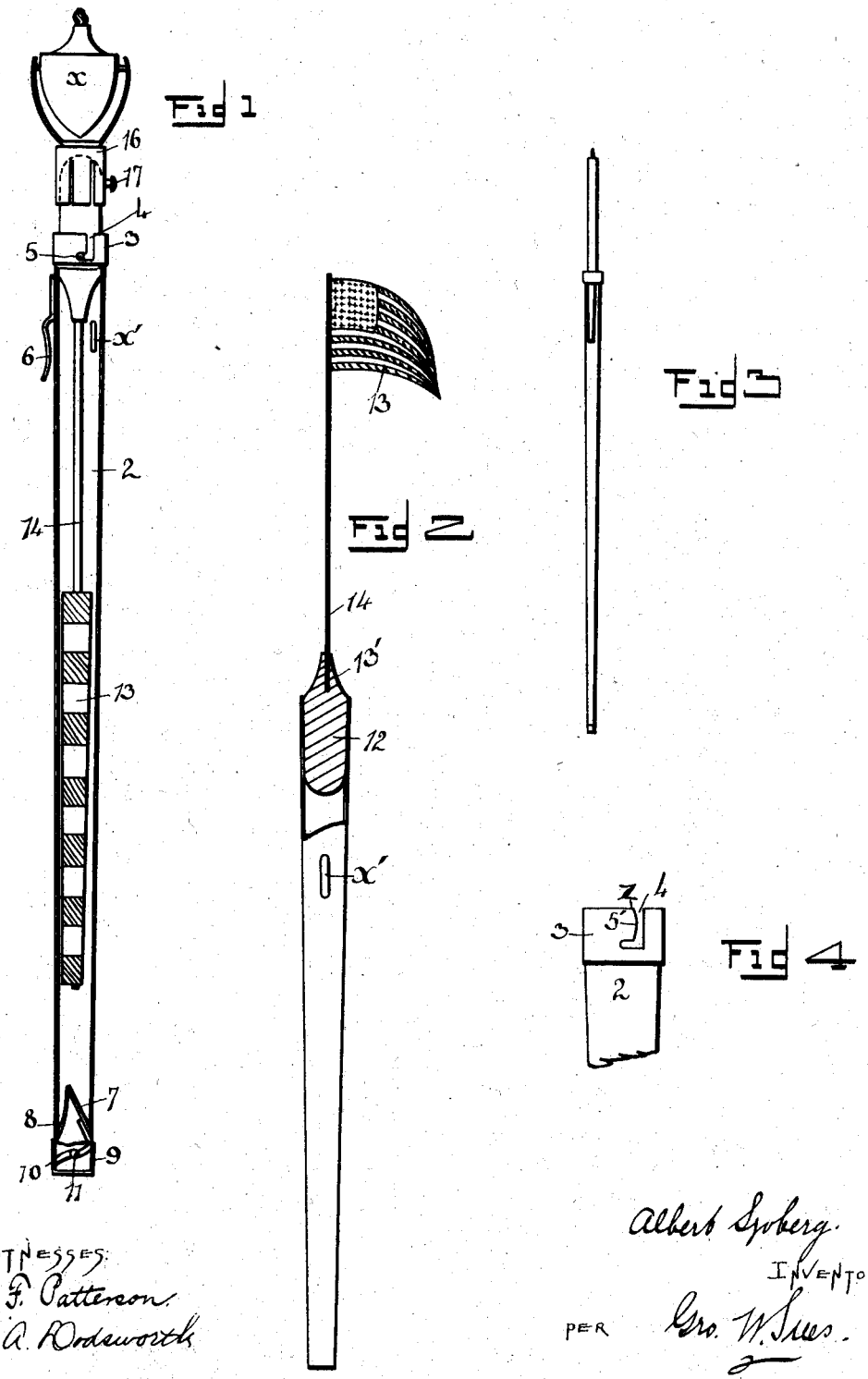

ALBERT SJOBERG, OF LINCOLN, NEBRASKA, ASSIGNOR OF ONE-HALF TO JOSEPH W. EDGERTON, OF GRAND ISLAND, NEBRASKA.

CANE.

SPECIFICATION forming part of Letters Patent No. 706,501, dated August 5, 1902.

Application filed February 19, 1900. Serial No. 5,862. (No model.)

*To all whom it may concern:*

Be it known that I, ALBERT SJOBERG, residing at Lincoln, in the county of Lancaster and State of Nebraska, have invented certain useful Improvements in Canes; and I do hereby declare that the following is a full, clear, and exact description of the invention, such as will enable others skilled in the art to which it appertains to make and use the same, reference being had to the accompanying drawings, which form a part of this specification.

This invention relates to an improvement in canes and comprises a campaign novelty.

The object of my invention is to provide a campaign novelty adapted to be used for different purposes, arranged to be used by any party, and embodies a horn which is made in the form of a cane, the body of which is adapted to serve as a receptacle to receive a certain flag, while to the projecting end of the flag-holder is adapted to be removably secured a torch, the horn or housing further being provided with a hook, so that it may be carried scabbard-like in connection with a belt.

In the accompanying drawings I have shown in Figure 1 a partly-sectional view with portions removed of my invention, showing a torch secured to the cane or horn. Fig. 2 shows a portion with parts broken away, disclosing the device while used as a flagstaff. Fig. 3 shows the same as being used as a Roman-candle holder, while Fig. 4 shows a broken detached view of the upper end of my horn or cane.

My invention embodies, essentially, a cane 2 in the form of a horn, preferably of tin, though other materials may be used, which above is provided with the collar 3, provided with an ordinary bayonet-socket 4, into which a pin 5, forming part of a flag-socket, is inserted. Near the upper end this cane is provided with a hook 6, so that the same may be hooked into the waistband of the user's trousers. Below this cane is provided with a reed or other noise-making material 7, which is held in place by means of a holder 8, secured within the lower end of the cane. In order to protect this mouth end of the cane when used as a horn, I provide an ordinary cap 9, having a groove 10, into which is adapted to fit a projection 11, forming part of the cane-tubing 2. In this connection the device is in the form of a horn provided with the hook and bayonet-slot. In this form the cane is also nicely adapted to be used as a Roman-candle holder, as is shown in Fig. 3, as the size of the cane is nicely adapted to receive a Roman candle.

Forming the handle end of the device when used as a cane is a socket 12, one end of which is rounded, the other somewhat pointed, as is shown, and provided with an opening 13, adapted to receive the stem of a suitable flag 14, and when this socket, which is provided with a pin 5, as is shown in Fig. 1, is inserted into the casing or cane the flag 15 is protected within the cane, which so forms a neat receptacle for this flag, and in this condition the rounded end of the cane projects upward, as is indicated in dotted lines in Fig. 1.

In connection with my device I use a torch $x$, provided with a slotted collar 16, also having a pin 17, so that this torch may be placed upon the flag-socket 12 when the same is used as a cane or be secured to the cane proper by means of the pin 17 working into the bayonet-socket 4, so that an operator could use the device as a horn with a glowing torch at one end, while at the same time he could carry the flag-socket 12 with a flag. The torch is in the nature of an adjunct to the device and, if desired, may be eliminated. As the rim 3 at the upper end of the cane is quite pliable, I force one portion of this rim inward, as shown at 5', so that the pin 5 of the bayonet-socket or pin 17 of the torch has got to force the portion marked $z$ of this rim outward to permit the escape of the pin, so that the pin is forced into its socket under pressure, preventing the socket from flying out when the flag or torch is used and being waved.

In order that the cane may be used as a horn while the flag-socket is in place, a slot $x'$ is provided, as shown in Figs. 1 and 2, so that the air may escape, and this slot also facilitates the removal of a Roman candle in case it should bind itself into the cane, as a knife-blade or nail can be placed within this slot to prevent the candle from working down or facilitate the removal of the same.

From this it will be seen that my invention embodies a cane in the form of a horn having a hook, so that the same may be used as a scabbard, the whole forming a Roman-candle holder, a suitable mouthpiece being at the lower end of the cane, while the flag-socket is adapted to be put within the upper end of the cane adapted to receive a flag. This socket when the device is to be used as a cane has its finished end locked into the cane, which cane at the same time also serves as a receptacle to receive a furled flag secured to said socket.

Now, having thus described my said invention, what I claim as new, and desire to secure by United States Letters Patent, is—

A cane constructed as shown and comprising the cylindrical sheet-metal cone portion 2, of the upper strengthening-collar 3, both collar and upper cane portion being provided with an L-shaped incision, of the carrying-hook 6 secured near the upper end of the cane so that said cane may be carried scabbard fashion, aforesaid cane being open at the lower end and provided with the reed or horn portion 7, in combination with a suitable socket adapted to fit into the upper end of the cane and having a pin 5 adapted to be held within aforesaid L-shaped incision.

ALBERT SJOBERG.

In presence of—
J. W. EDGERTON,
J. S. HYATT.